(12) United States Patent
Suzuki et al.

(10) Patent No.: US 7,343,893 B2
(45) Date of Patent: Mar. 18, 2008

(54) INTERNAL COMBUSTION ENGINE

(75) Inventors: Masatoshi Suzuki, Wako (JP); Hayato Maehara, Wako (JP); Satoshi Iijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 11/391,080

(22) Filed: Mar. 28, 2006

(65) Prior Publication Data

US 2006/0231059 A1 Oct. 19, 2006

(30) Foreign Application Priority Data

Mar. 30, 2005 (JP) .............................. 2005-099999
Nov. 2, 2005 (JP) .............................. 2005-320172

(51) Int. Cl.
F02B 75/32 (2006.01)

(52) U.S. Cl. ..................... 123/197.4; 74/603; 74/572.2

(58) Field of Classification Search ............. 123/197.4, 123/192.2, 192.1; 74/603, 572.2
See application file for complete search history.

(56) References Cited

U.S. PATENT DOCUMENTS 3,403,605 A * 10/1968 Schmidt ...................... 92/187
5,615,642 A * 4/1997 Coughlin .................... 123/54.4
6,032,635 A * 3/2000 Moorman et al. ......... 123/196 R
6,763,586 B2 * 7/2004 Schliemann et al. ...... 29/888.08

FOREIGN PATENT DOCUMENTS

JP 57001846 A * 1/1982
JP 8-303254 11/1996

* cited by examiner

Primary Examiner—Stephen K. Cronin
Assistant Examiner—Hyder Ali
(74) Attorney, Agent, or Firm—Hamre, Schumann, Mueller & Larson, P.C.

(57) ABSTRACT

An internal combustion engine includes a connecting rod that connects a crankpin and a piston. The connecting rod has first and second connecting rods, and a guide piston is disposed at a connecting portion between the first and second connecting rods. Deformed portions are formed on a lower end portion of a guide piston and on a balancer weight portion of a crankshaft in order to reduce the whole length of the connecting rod, whereby a bottom dead center of the guide piston is set to a lower position. The engine has improved thermal efficiency by reducing the distance between the crank portion and the piston, increasing the speed of behavior of the piston at a position near a top dead center to reduce thermal energy loss, and preventing generation of knocking.

3 Claims, 7 Drawing Sheets

INTERNAL COMBUSTION ENGINE

FIELD

The present invention relates to an improved structure for improving thermal efficiency and prevention of knocking in an internal combustion engine and, more specifically, to a structure focused on an improvement of a crank chain in an internal combustion engine.

BACKGROUND

An internal combustion engine is known where efficiency of a crank movement of a crank chain is improved by reducing friction due to a side pressure applied to a piston from an inner wall of a cylinder bore. In particular, a structure is known where the side pressure to the inner wall of the cylinder bore applied to the piston is reduced by employing a two-piece connecting rod including first and second connecting rods and a guide member at a joint portion thereof, and a rolling member provided at the guide member is brought into rolling contact with the inner wall of the cylinder bore to reduce the side pressure applied to the inner wall of the cylinder bore, which is applied in turn to the piston. For example, see Japanese Utility Model Application No. 60-63357 (JP-UM-A-61-179341) and JP-A-8-303254.

In JP-UM-A-61-179341 and JP-A-8-303254, and with reference to FIGS. 8 and 9, crank chains in engines are each provided with a two-piece connecting rod 02 having first and second connecting rods 021, 022. The first connecting rod 021 is connected at one end 021*a* thereof to a crankpin 01*a* of a crankshaft 01 and is connected at the other end 021*b* thereof to a sliding member 0P2 provided with a rolling member 0P21, such as a roller bearing or a wheel, to be guided by an inner wall of a cylinder bore 020*a* in contact thereto. The second connecting rod 022 is connected at one end 022*a* thereof to the sliding member 0P2 and is mounted to and holds a piston (slide runner) 0P1 at the other end 022*b* thereof. As a result, a structure provided with the connecting rod 02 as a single member including the first connecting rod 021 and the second connecting rod 022 connected to each other via the sliding member 0P2 is achieved.

The crank chain is adapted to reduce friction by receiving a side pressure applied to the inner wall of the cylinder bore 020*a* due to the operation of the first connecting rod 021 at the time of a crank movement by the sliding member 0P2 provided with the rolling member 0P21 (such as the smoothly rotating roller bearing or the wheel) and reducing the side pressure to the inner wall of the cylinder bore 020*a* received by the piston 0P1 mounted to the second connecting rod 022, so that energy loss due to friction or the like during the crank movement is reduced by smoothing the reciprocal sliding movement between the piston 0P1 and the inner wall of the cylinder bore 020*a*, whereby improvement of efficiency of the engine is achieved.

In JP-UM-A-61-179341 and JP-A-8-303254, the crank chains are each provided with the two-piece piston connecting rod including the first and second connecting rods as described above, and structurally, a distance between a crank web portion and the piston is relatively long, and hence the first connecting rod is relatively long.

Regarding a behavior of the piston in the crank chain, a long connecting rod connecting the crankpin and piston is not suitable for increasing the speed of the piston, in particular the behavior of the piston near a top dead center.

Delay of the piston behavior leads to thermal energy loss by an amount corresponding to an excessive time due to the delay of the piston behavior. In particular, in a quick combustion engine which requires a quick piston behavior, the engine structure in which the length of the piston connecting rod is long as described above can hardly be employed.

Therefore, a crank chain in which a quick piston behavior near the top dead center of the piston is achieved during the crank movement is required.

SUMMARY

An internal combustion engine that solves these and other problems inherent in the prior art is described that provides improvements of a crank chain.

In one embodiment, an internal combustion engine includes a crankshaft having flywheels on both sides of a crankpin, and a connecting rod having a large end portion and a small end portion, with the large end portion connected to the crankpin of the crankshaft and the small end portion is connected to a piston which slides in a cylinder bore via a piston pin. The flywheels are cut out at part of an outer peripheral portion thereof on a side opposite from the crankpin to reduce the length of the connecting rod.

Since the disk-shaped flywheels are cut out at the part of the outer peripheral portion thereof on the side opposite from the crankpin, the crankshaft is located in closer proximity to the piston pin. Therefore, the length of the connecting rod is reduced to increase the speed of the piston at a position near a top dead center, and heat released through the cylinder wall surface due to increase in piston speed can be minimized to effectively prevent lowering of a combustion pressure.

In another embodiment, plugs with a high specific gravity are provided on the flywheels on the side of the flywheel opposite from the crankpin. Therefore, a sufficient inertia mass can be achieved by increasing the weight of the portion opposite from the crankpin in comparison with the weight of the piston on the crankpin side and the connecting rod, and the cutout on the outer peripheral portion of the flywheel on the side opposite from the crankpin is increased. As a result, the piston speed at the position near the top dead center of the piston can be increased by reducing the length of the connecting rod in comparison with a crank radius owing to the cutout of the flywheel on the side opposite from the crankpin, whereby a cooling loss to the cylinder wall surface is reduced, thereby improving a thermal efficiency.

In the internal combustion engine, an axial line passing through a center of the cylinder bore is arranged at a position shifted toward one side with respect to a rotation center of the crankshaft, and a skirt portion of the piston is guided by an inner wall of the cylinder bore in contact with the inner wall of the cylinder bore, and the skirt portion has a width in the vertical direction on the one side that is larger than the width in the vertical direction on an opposite side. Therefore, the skirt portion on the side opposite from the offset side can be downsized by the offset, and hence the piston pin portion can be provided at a position closer to the crankshaft.

In another embodiment, an internal combustion engine includes a crankshaft having disk-shaped flywheels on both sides of a crankpin, with the flywheels having opposed facing side surfaces. A connecting rod has a large end portion and a small end portion, with the large end portion connected to the crankpin of the crankshaft and the small end portion is connected to a piston which slides in a cylinder bore via a piston pin. A distance between the opposed facing side surfaces of the disk-shaped flywheels is larger than the width of the piston pin, and both ends of the piston pin can travel between the opposed facing side surfaces of the disk-shaped flywheels. Therefore, the length of the connecting rod can be reduced so that the piston speed at the position near the top dead center is increased, whereby the thermal energy released through the wall surface of the combustion chamber can be minimized to prevent lowering of the combustion pressure effectively.

In addition, a distance between the opposed facing side surfaces on the crankpin side of the flywheels is less than the distance between the opposed facing side surfaces on the side of the flywheels opposite the crankpin. Therefore, the inertia mass of the flywheels can be secured while downsizing the crankpin portion, whereby the crankshaft can be downsized.

DETAILED DESCRIPTION

Figure 1:
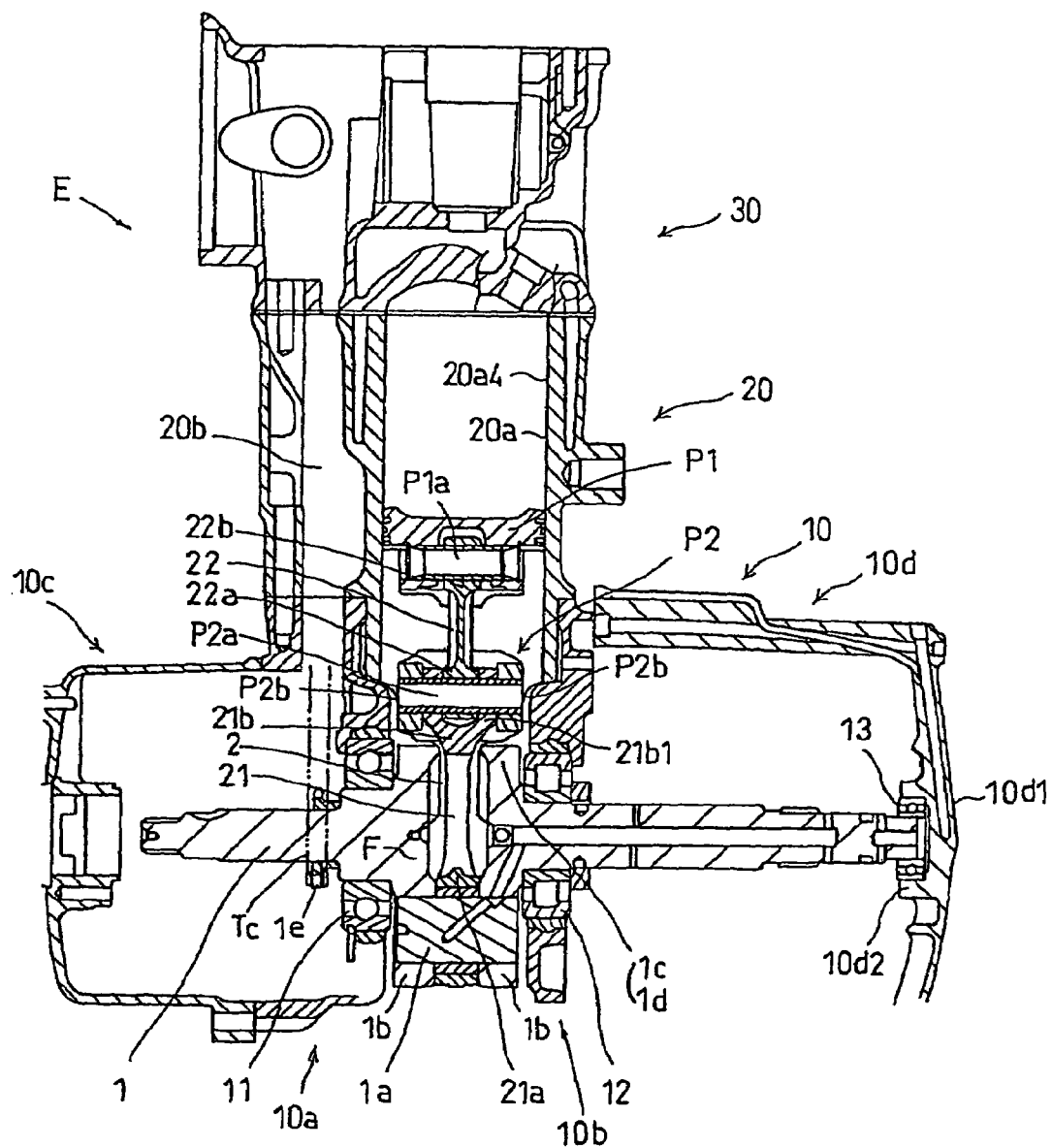
FIG. 1 is a front cross-sectional view of an internal combustion engine showing a structure of a principal portion of a crank chain in the present invention.
Figure 2:
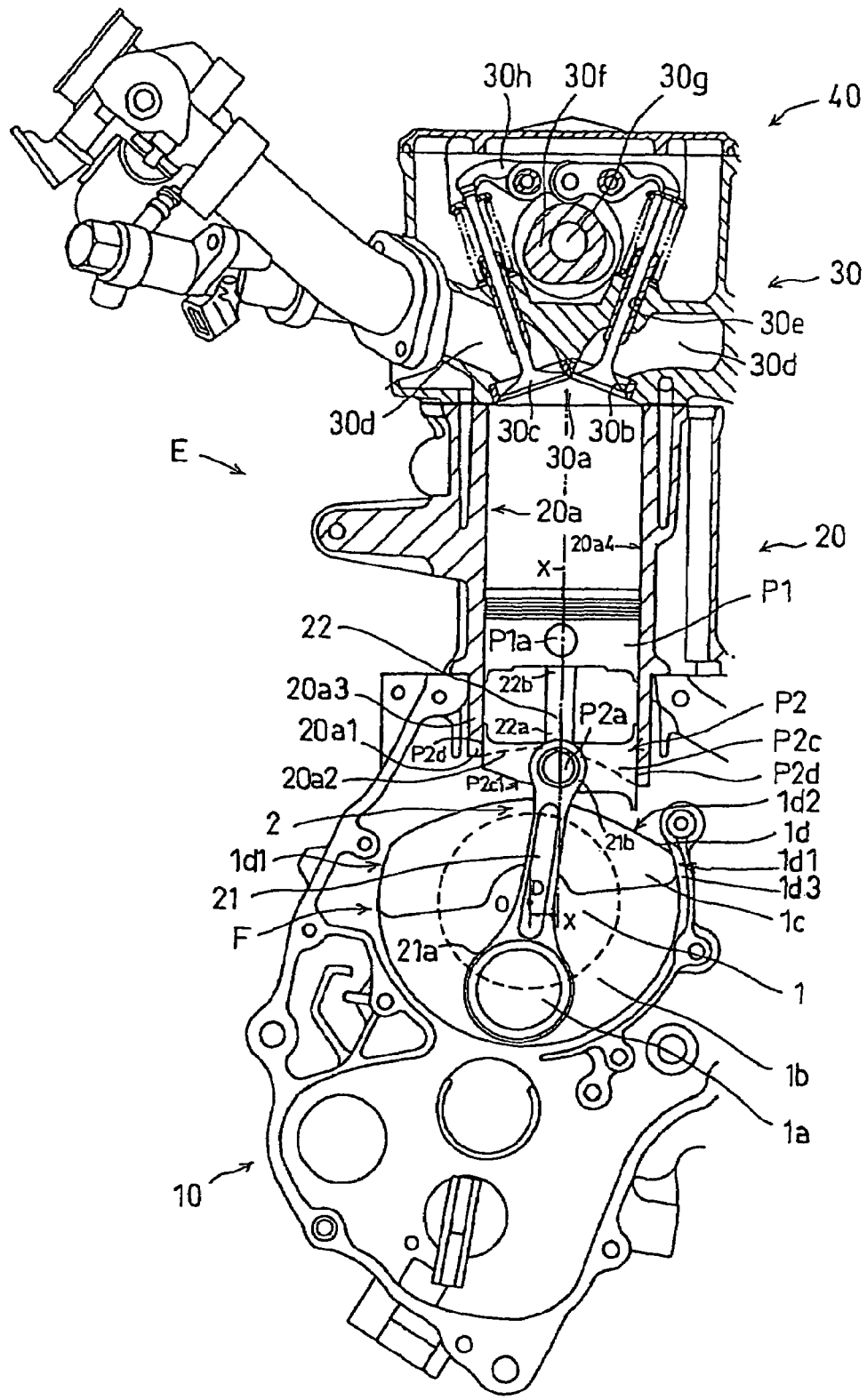
FIG. 2 is a side cross-sectional view of the internal combustion engine showing the structure of the principal portion of the crank chain in the present invention.

FIGS. 1 and 2 show cross-sections of a principal structure of an internal combustion engine E according to a first embodiment, where the internal combustion engine E includes a crankcase 10, a cylinder block 20 connected to an upper portion (in the drawing) of the crankcase 10, a cylinder head 30 connected to the upper portion of the cylinder block 20, and a head cover covering an upper portion of the cylinder head 30.

As shown in FIG. 1, the crankcase 10 includes left and right half cases 10a, 10b, and case covers 10c, 10d for covering openings of the left and right half cases 10a, 10b. A crankshaft 1 is rotatably supported in the crankcase 10 via a bearing. The bearing support of the crankshaft 1 in the crankcase 10 is achieved by two main bearings 11, 12 on the left and right half cases 10a, 10b at both sides of a crank portion and a bearing 13 at a right shaft end of the crankshaft 1 on the right case cover 10d of the right half case 10b.

The support by the main bearings 11, 12 at both sides of the crank portion of the crankshaft on the left and right half cases 10a, 10b is such that the main bearing 11 on the left side is a radial ball bearing and the main bearing 12 on the right side is a roll bearing. The support by the bearing 13 on the case cover 10d of the right half case 10b on the right shaft end of the crankshaft 1 is achieved by a relatively small ball bearing which is fitted to an inner wall boss portion 10d2 on an outer wall structure 10d1 of the case cover 10d.

The cylinder block 20 is provided with a cylinder bore 20a which penetrates therethrough in the vertical direction (in the drawing) and, as shown in FIG. 2, the cylinder bore 20a is removed 20a2 in an arcuate shape in such a manner that a lower end 20a1 of a wall forming a left side in the drawing is cut out obliquely upward from a right side because it is close to the crank portion described later to form a short lower-side-forming wall 20a3. A piston P1 performs a reciprocal sliding movement in the cylinder bore 20a as well known, and a guide piston P2 (described later) performs a reciprocal sliding movement. The cylinder block 20 is formed with a through space 20b (see FIG. 1) for allowing passage of a timing chain Tc for transmitting the rotation of the crankshaft 1 to a camshaft 30g via a sprocket le on the shaft 1.

The cylinder head 30 is provided with a combustion chamber 30a defined by a recess on a lower portion thereof and an upper portion of the cylinder bore 20a, and an ignition plug (not shown), an opening 30b for air intake and exhaust, an air intake and exhaust valve 30c and so on are provided in the combustion chamber 30a. An intake and exhaust channel 30d and a mounting hole 30e for a valve stem are disposed in the cylinder head 30, and a valve mechanism including a cam 30f, a camshaft 30g, a rocker arm 30h, and so on is arranged upwardly thereof. The exposed upper portion thereof is covered by the head cover 40.

As described above, the crankshaft 1 is rotatably supported by the bearing on the crankcase 10, and the relation between the crankshaft 1 and the cylinder bore 20a is such that a center axis X of the cylinder bore 20a is offset D to the right side in the drawing with respect to a rotation center O of the crankshaft 1 as will be understood from a side view of the engine shown in FIG. 2, whereby the side pressure from the piston P1 or the guide piston P2 applied to an inner wall 20a4 of the cylinder bore is alleviated in relation to the connecting rod 2.

The crankshaft 1 is provided with a single crankpin 1a and a pair of crank arm portions 1b, 1b on both sides of the crankpin 1a are provided with crank web portions 1c, 1c that continue to the arm portions 1b, 1b, respectively. The crank arm portions 1b, 1b and the crank web portions 1c, 1c are integrated into a substantially circular shape in side view in FIG. 2, and form flywheels F, F which are inertia mass members presenting substantially a disk shape having crank arm portions 1b, 1b on the crankpin 1a side which corresponds to the lower portion of the substantially circular shape, and crank web portions 1c, 1c on the side opposite from the crankpin 1a which corresponds to the upper portion in the drawing.

The disk-shaped flywheels F, F are provided with balancer weight portions 1d, 1d of semi-circular like shape formed by increasing the thickness of the crank web portions 1c, 1c on the side opposite from the crankpin 1a, that is, on the side of the web portions, and the balancer weight portions 1d, 1d are formed to have characteristic outlines described later. Accordingly, the balancer weight portions 1d, 1d of the crankshaft 1, which is offset D from the center line X of the cylinder bore 20a, on the side opposite from the crankpin can be provided at a position closer to the guide piston P2 having a deformed portion on the lower side thereof, or positioned closer to the deformed portion on the lower side thereof, or positioned closer to the deformed lower-side-forming wall 20a2 of the cylinder bore 20a.

In other words, the balancer weight portions 1d, 1d located on the disk-shaped flywheels F, F on the opposite side of the crankpin 1a are, as shown in FIG. 2, formed into a semi-circular like shape in side view defined by an outline including a pair of outline portions 1d1, 1d1 positioned so as to lay along arcuate portions 1d3 of the outlines of the disk-shaped flywheels F, F, and an outline portion 1d2 with part of the arcuate portion 1d3 interposed between the pair of outline portions 1d1, 1d1 removed along a curve, whereby the balancer weight portions 1d, 1d can be provided at positions closer to the guide piston P2 provided with the deformed portion and closer to the deformed lower-side-forming wall 20a2 of the cylinder bore 20a by an amount corresponding to the removed (cut out) portion.

A connecting rod 2 is connected to the single crankpin 1a of the crankshaft 1, and the connecting rod 2 has a two-piece structure including a first connecting rod 21 and a second connecting rod 22. The first connecting rod 21 is rotatably connected to the crankpin 1a at one end, that is, at an end portion 21a which practically constitutes a large end portion of the connecting rod 2, and is rotatably connected to the above-described guide piston P2 at the other end 21b via a pin portion P2a which passes through a center portion of a main body of the guide piston, formed of sliding arms P2c, P2c extending on the left and right sides of the guide piston P2 in FIG. 2.

The second connecting rod 22 of the connecting rod 2 is connected to the above-describe piston P1 so as to be capable of pivotal movement via a piston pin P1a at the other end 22b, that is, at the end portion 22b which practically constitutes a small end portion of the connecting rod 2. The other end 22a is rotatably connected to the pin portion P2a of the guide piston P2. The second connecting rod 22 characteristically has a relatively short structure.

The guide piston P2 which performs the reciprocal sliding movement on a lower side in the cylinder bore 20a connects the first and second connecting rods 21, 22 via the pin portion P2a by rotatably connecting and supporting the other end 21b of the first connecting rod 21 and the one end 22a of the second connecting rod 22, whereby both connecting rods 21, 22 form the single connecting rod 2.

The pin portion P2a of the guide piston P2 extends so as to pass through the center portion of the main body including the sliding arms P2c, P2c of the guide piston P2 extending in the lateral direction, so that the pin portion P2a is orthogonal to the extending direction of the sliding arms P2c, P2c and parallel with the crankshaft 1. Both pin ends P2b, P2b (see FIG. 1) are fixed to the main body portion of the guide piston P2 so as not to rotate. The one end 22a of the second connecting rod 22 is rotatably connected and supported at the center portion of the pin portion P2a in the longitudinal direction as described above, and the other end 21b of the first connecting rod 21 is rotatably connected and supported as described above so as to sandwich the one end 22a of the second connecting rod 22 with its bifurcated branched end 21b1 from both sides.

The sliding arms P2c, P2c that form the main body of the guide piston P2 and that extend to the left and right sides so as to pass across the cylinder bore 20a in FIG. 2 in the direction orthogonal to the crankshaft 1 are provided with sliding surfaces P2d, P2d which are in sliding contact with the inner wall of the cylinder bore 20a at the distal ends thereof, and the sliding surfaces P2d, P2d are provided with arcuate surfaces that extend along the inner wall of the cylinder bore 20a which is rather wide in the vertical and lateral direction.

The guide piston P2 also has a structure which allows positioning of the crankshaft 1 at a position closer to the crank portion in the state in which the center line X of the cylinder bore 20a is offset toward the right side in FIG. 2 by the amount D with respect to the rotation center axis O of the crankshaft 1. In particular, the guide piston P2 is provided with deformed portions on the sliding arms P2c, P2c and the sliding surfaces P2d, P2d.

The deformed portions on the sliding arms P2c, P2c and the sliding surfaces P2d, P2d are shaped to avoid contact with the balancer weight portions 1d, 1d of the flywheels F, F at the positions closest to each other during crank movement in order to achieve reduction in distance between the guide piston P2 and the balancer weight portions 1d, 1d of the flywheels F, F. That is, the deformed portions on the sliding arms P2c, P2c and the sliding surfaces P2d, P2d cooperate with the deformed portion having the outline 1d2 with the portion of the arcuate portion 1d3 linearly removed.

Therefore, the arm P2c on the right side in FIG. 2 of the sliding arms P2c, P2c is not deformed specifically. Only the lower portion of the left arm P2c of the sliding arms P2c, P2c is removed P2c1 so as to be cut off P2c1 obliquely upwardly from the right side to the left side. The sliding surfaces P2d, P2d of the distal ends of the pair of sliding arms P2c, P2c are slightly large in the vertical and lateral directions as described above and include arcuate surfaces extending along the inner wall of the cylinder bore 20a. However, the sliding surface P2d on the left side in FIG. 2 has a smaller width in the vertical direction in comparison with the sliding surface P2d on the right side in the vertical direction as a result of cutting a lower skirt portion thereof.

The removed structure P2c1 of the sliding arms P2c and the sliding surfaces P2d of the guide piston P2, and the arcuate shaped removal of the lower end 20a1 of the cylinder bore and the lower-side-forming wall 20a2, enable closer positional relation between the guide piston P2 and the lower end 20a1 of the cylinder bore with respect to the balancer weight portions 1d, 1d of the crankshaft 1. As a result, a shorter structure of the first connecting rod 21 is achieved, and in cooperation with the short structure of the second connecting rod 22, the close structure between the balancer weight portions 1d, 1d of the flywheels F, F and the piston P1 is achieved.

As will be understood from FIG. 1 and FIG. 2, the guide piston P2 and the balancer weight portions 1d, 1d of the disk-shaped flywheels F, F on both sides of the crankpin 1a of the crankshaft 1 enable reduction in distance therebetween, and the length of the first connecting rod 21 is reduced. Since the second connecting rod 22 is formed to have a length as short as possible, the overall length of the connecting rod 2 is reduced, thereby achieving a structure in which the distance between the balancer weight portions 1d, 1d of the disk-shaped flywheels F, F of the crankshaft 1 with respect to the piston P1 is reduced.

The reduction in length of the first connecting rod 21 enables achievement of high speed and acceleration of the reciprocal sliding movement of the guide piston P2 in the cylinder bore 20a during the crank movement. The increased high speed and acceleration of the guide piston P2 enable high speed and acceleration of reciprocal sliding movement of the piston P1, whereby the speed of the behavior of the piston P1 is increased to efficiently promote conversion of thermal energy to kinetic energy of the piston P1. Therefore, the efficiency of recovery of the combustion energy is improved to improve the thermal efficiency and preventing occurrence of knocking by preventing excessive heating of a wall portion of a combustion chamber by the thermal energy.

Figure 3:
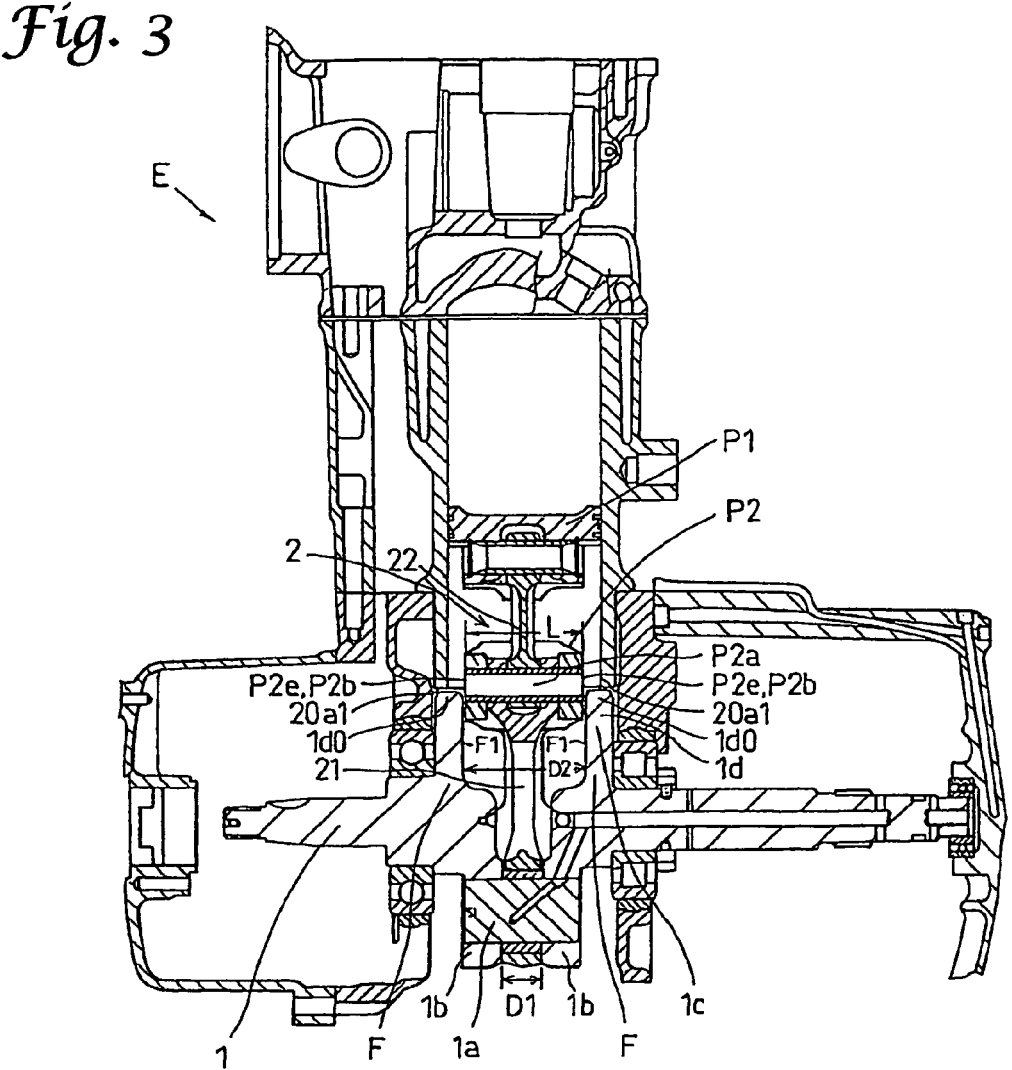
FIG. 3 is a front cross-sectional view of the internal combustion engine showing the principal structure of the crank chain according to another embodiment of the present invention.
Figure 4:
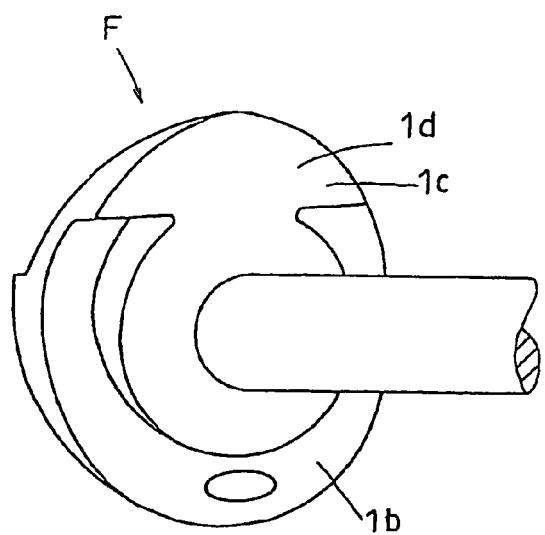
FIG. 4 is a perspective view showing a balancer weight portion of a flywheel in FIG. 3.

FIGS. 3 and 4 illustrate another embodiment of an internal combustion engine E. The internal combustion engine E in this embodiment is common to the engine E in the first embodiment described above in much of the structure and the corresponding structures are represented by the same reference numerals. However, the crankshaft 1 and the structures related thereto are different in structure.

With reference to FIGS. 3 and 4, the crankshaft 1 is provided with the single crankpin 1a, and the crankpin 1a is provided with the first and second connecting rods 21, 22 as in the case of the first embodiment described above and the piston P1 is mounted thereto via the guide piston P2. Since the structures of these members as a whole and the structures of the piston P1 and the guide piston P2 themselves are not specifically different from the first embodiment described above, description about the structures of these members are omitted.

The crankshaft 1 is provided with the single crankpin 1a, and the pair of crank arm portions 1b, 1b and the crank web portions 1c, 1c continuing to the arm portions 1b, 1b on both sides of the crankpin 1a are formed integrally to form the flywheels F, F which are the substantially integral inertia mass members each presenting a circular shape in side view shown in a perspective view in FIG. 4.

Therefore, the crank arm portions 1b, 1b are formed on the crankpin 1a side of the disk-shaped flywheels F, F and the crank web portions 1c, 1c are formed thereon on the opposite side from the crankpin 1a. The crank web portions 1c, 1c are substantially the balancer weight portions 1d, 1d. The balancer weight portions 1d, 1d of the disk-shaped flywheels F, F are formed by increasing the thickness of the crank web portions 1c, 1c of the flywheels F, F, and formed into a shape similar to a half moon as shown in FIG. 4.

As shown in FIG. 3, the disk-shaped flywheels F, F are provided with opposing surfaces F1, F1 facing inwardly thereof which constitutes a pair formed on both sides of the crankpin 1a. A distance D1 between the opposing surfaces F1, F1 is relatively narrow on the crankpin 1a side, and a distance D2 between these surfaces increases on the side opposite from the crankpin 1a; that is, on the side where the balancer weight portions 1d, 1d are formed. Therefore, although the disk-shaped flywheels F, F have a substantially circular shape in side view, they are shaped with shoulders that are shifted from each other in the direction of the thickness.

The distance D2 between the surfaces F1, F1 of the disk-shaped flywheels F, F on the side opposite from the crankpin 1a is larger than the length L of the pin portion P2a that has a length extending over substantially the entire lateral width of the guide piston P2, whereby the opposed surfaces F1, F1 of the pair of disk-shaped flywheels F, F can receive the guide piston P2 therebetween with a predetermined clearance as the guide piston is moved downward to the bottom dead center or near the bottom dead center (a state shown in FIG. 3) during the crank movement.

In practice, the reception of the guide piston P2 between the pair of opposed surfaces F1, F1 of the flywheels allows entry of the guide piston P2 to a position between the inner surfaces of the balancer weight portions 1d, 1d of the flywheels F, F shown in FIG. 3 along both side surface portions P2e, P2e of the guide piston P2 in the lateral direction, that is, along both pin ends P2b, P2b of the pin portion P2a of the guide piston P2.

Therefore, outer peripheral ends 1d0, 1d0 of the balancer weight portions 1d, 1d rotate along the side surface portions P2e, P2e of the guide piston when the guide piston P2 is moved downward to the bottom dead center or near the bottom dead center and, in this process, reach to a position nearest to the lower end 20a1 of the cylinder wall in the cylinder bore 20a.

The structure of the outer peripheral ends 1d0, 1d0 of the balancer weight portions 1d, 1d that allows entry of the guide piston P2 between the opposed surfaces F1, F1 of the pair of disk-shaped flywheels F, F on the side opposite from the crankpin 1a achieves positioning of the guide piston P2 closer to the crank portion without necessity of specific deformation of the guide piston P2 and the balancer weight portions 1d, 1d of the flywheels F, F. Consequently, this construction achieves positioning of the piston P1 closer to the crank portion, thereby realizing reduction in length of the connecting rod 21.

In FIGS. 1-4, the crankpin 1a and the piston P1 are connected by the short connecting rod 21, and hence the speed of behavior of the piston P1 near the top dead center of the piston P1 is increased. By increasing the behavior of the piston P1, conversion of the thermal energy to kinetic energy is quickly achieved, which reduces energy loss correspondingly. Since excessive heating of the wall portion of the combustion chamber by thermal energy is constrained, generation of knocking is effectively prevented. Therefore, an optimal engine structure is provided when applied to, for example, a quick combustion engine.

In FIGS. 1-2, the balancer weight portions 1d, 1d of the flywheels F, F and the guide piston P2 are respectively provided with the deformed portions that are formed into complementary shapes to allow reduction of the distance therebetween during the crank movement. Therefore, the structure in which the length of the connecting rod 21 is reduced can be employed, whereby the speed and the acceleration of the piston P1 can be increased to achieve quick conversion of thermal energy into kinetic energy. Consequently, reduction of heat loss is achieved, and excessive heating of the wall portion of the combustion chamber due to the thermal energy is constrained, whereby generation of knocking is effectively prevented.

In FIGS. 3 and 4, since the pair of disk-shaped flywheels F, F provided on both sides of the crankpin 1a oppose each other in such a manner that the opposed surfaces F1, F1 corresponding to the balancer weight portions 1d, 1d on the side opposite from the crankpin 1a have the large distance D2, the guide piston P2 can be received between the opposed surfaces F1, F1 during movement to the bottom dead center position, and the bottom dead center of the guide piston P2 can be set to a lower position correspondingly.

As a consequence, the positioning of the piston P1 closer to the crank portion is enabled, and the length of the connecting rod 21 can be reduced without providing specific deformation on the guide piston P2 and the balancer weight portions 1d, 1d of the flywheels F, F.

Figure 5:
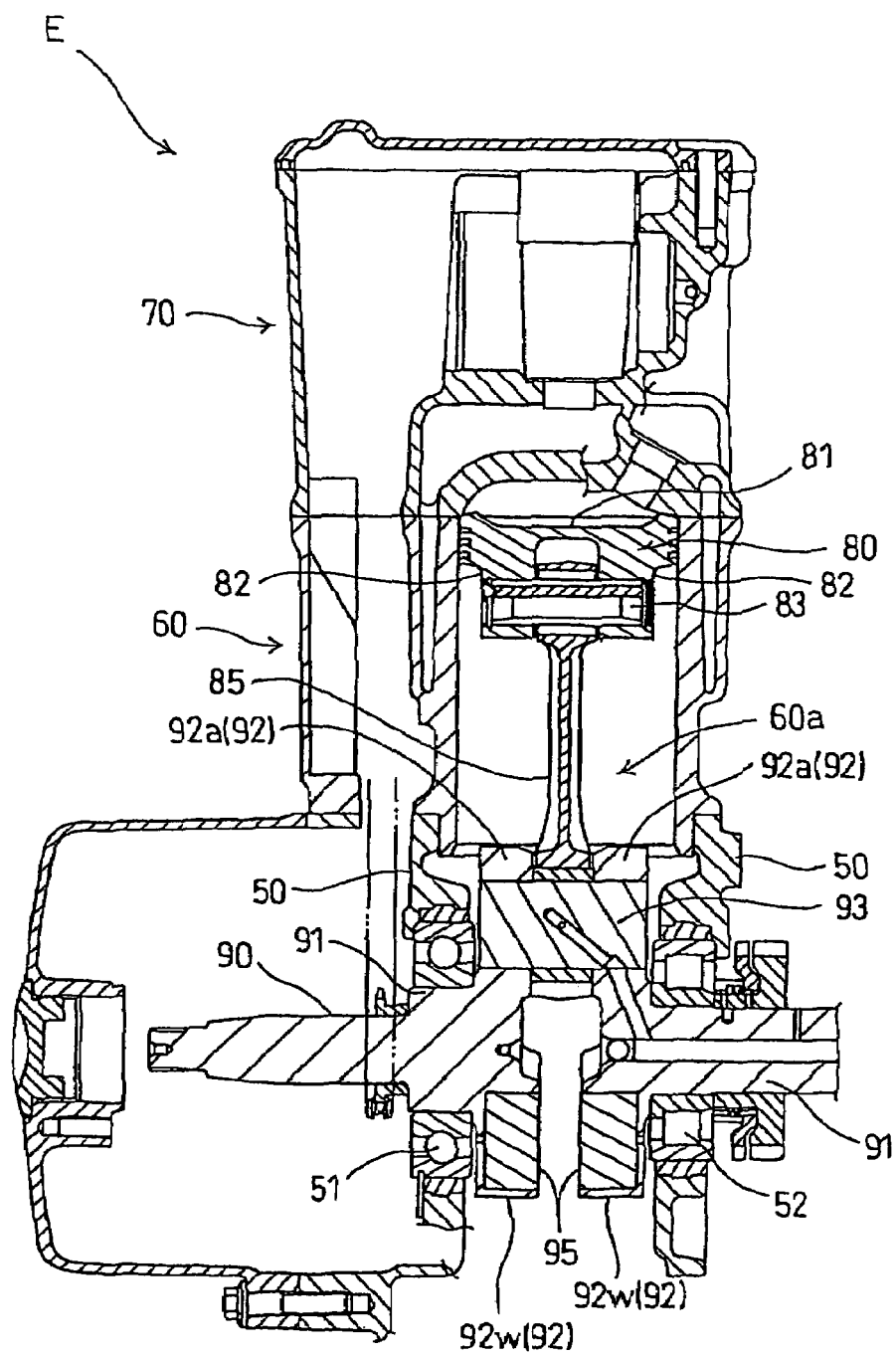
FIG. 5 is a front cross-sectional view of the internal combustion engine showing the structure of the principal portion of the crank chain according to another embodiment of the present invention in a state in which a piston is at a position near a top dead center.
Figure 6:
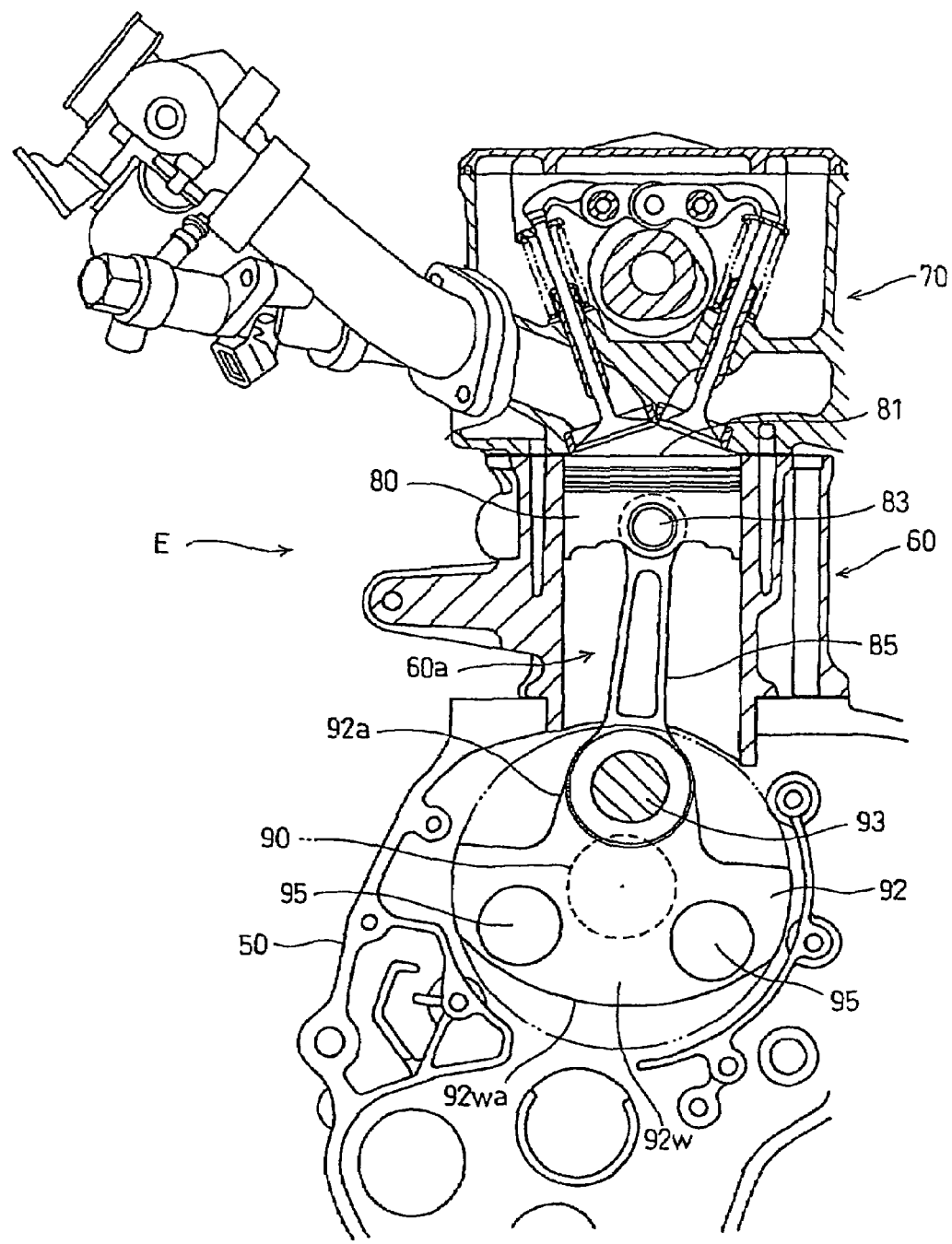
FIG. 6 is a side cross-sectional view of FIG. 5.
Figure 7:
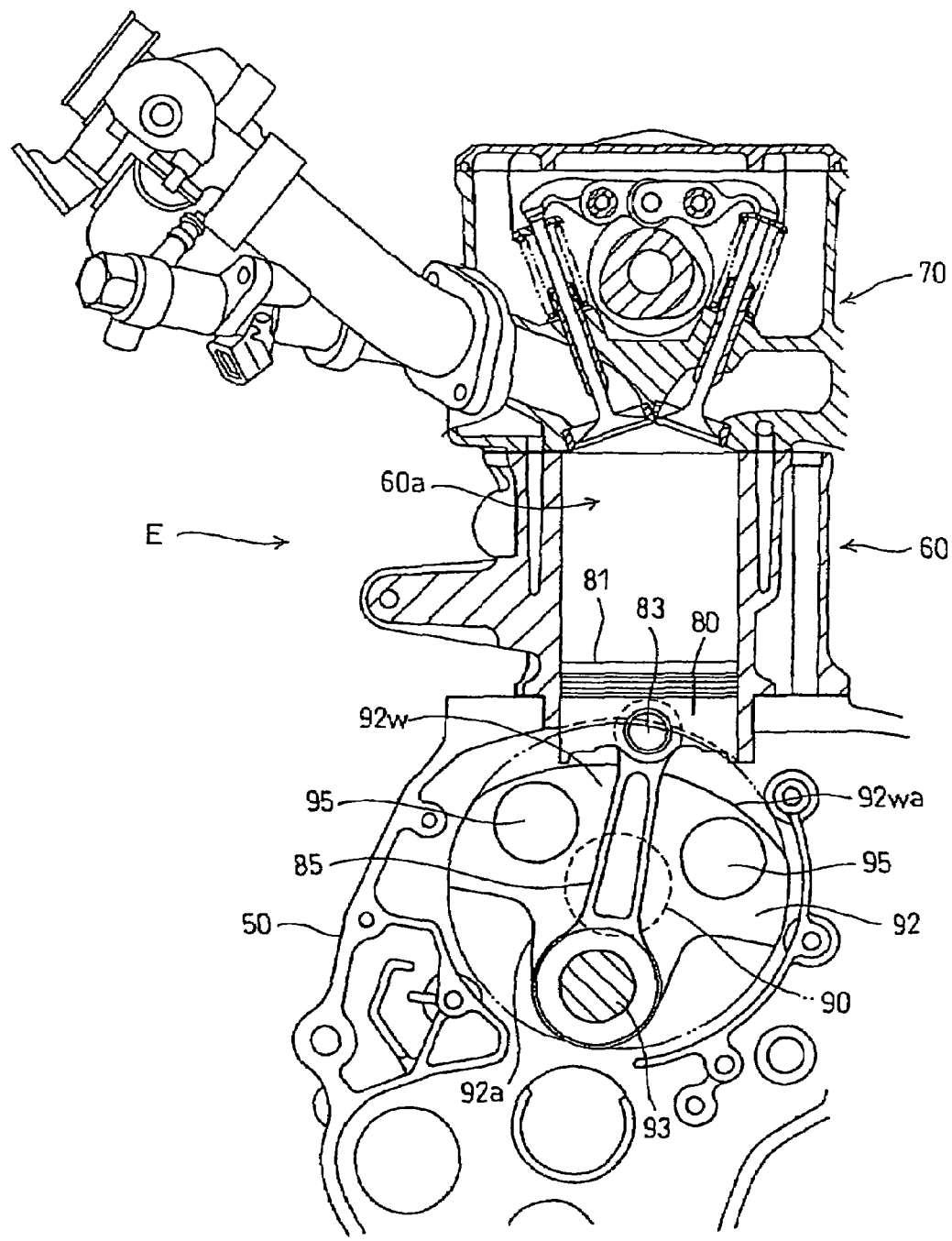
FIG. 7 is a side cross-sectional view of FIG. 5 when the piston is at the position near the bottom dead center.
Figure 8:
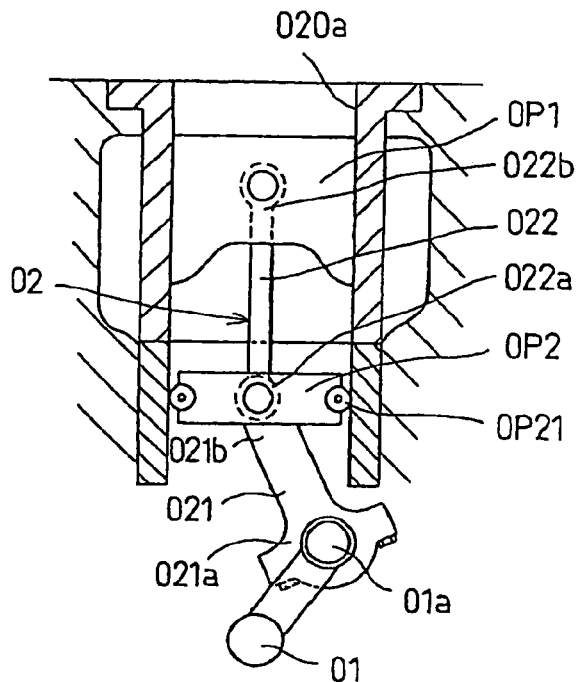
FIG. 8 is a drawing showing a crank chain in the related art.
Figure 9:
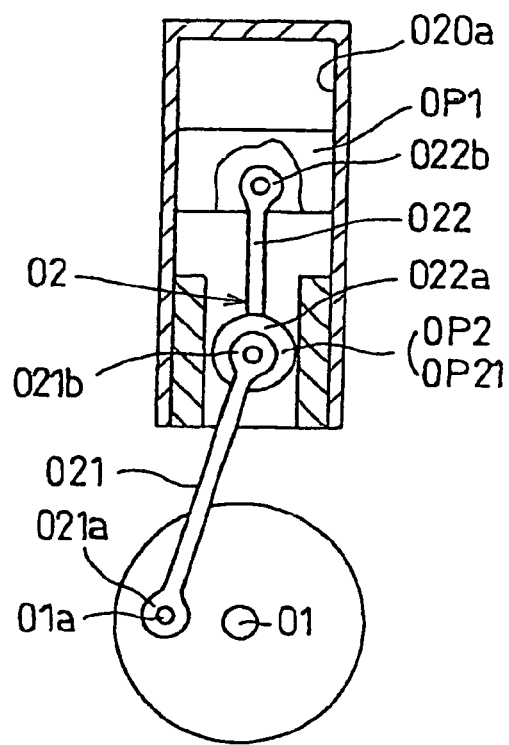
FIG. 9 is a drawing showing another example of a crank chain in the related art.

FIGS. 5-7 illustrate another embodiment of an internal combustion engine E. The internal combustion engine E is significantly different in crank chain from the embodiments in FIGS. 1-4 and has a slight modification in a crankcase 50 and a cylinder block 60, but a cylinder head 70 is not modified.

In FIGS. 5-7, the axial length of the cylinder block 60 is reduced, the distance between a mating surface with respect to the crankcase 50 and a mating surface with respect to the cylinder head 70 is reduced, and the shape near the mating surface with respect to the crankcase 50 is modified. Further, the crank chain in this embodiment is not provided with the guide piston.

A piston 80 which performs reciprocal sliding movement in a bore 60a of the cylinder block 60 is provided with a piston pin 83 laid across a pair of pin supporting arms 82, 82 projecting from a back surface of a piston crown portion 81 opposed to the combustion chamber.

On the other hand, a crankshaft 90 that is rotatably supported at a journal portion 91 by main bearings 51, 52 on the crankcase 50 has an opposing pair of crank web portions 92, 92 of a specific shape.

A counter weight portion 92w on the side opposite from the crankpin with respect to a rotation center of the crank web portion 92 is cut out on a circular outer peripheral portion of the crank web portion 92 having a largest diameter so that an outer peripheral edge 92wa is provided at a position closer to the center axis, and a crank arm portion 92a on the side of the crankpin has a shape projecting radially from the center portion.

The crank web portion 92 has a symmetrical shape with respect to a straight line connecting a rotation center of the crankshaft 90 and a center of a crankpin 93. The opposed crank arm portions 92a, 92a are connected by the crankpin 93.

The counter weight portion 92w of the crank web portion 92 having the symmetrical shape has plugs 95, 95 of flat column shape embedded at symmetric positions. The plugs 95 are formed of tungsten or the like material(s) having a high specific gravity.

A large end portion of a connecting rod 85 is supported by the crankpin 93 connecting the crank arm portions 92a, 92a so as to be capable of rotating about an axis thereof, and a small end portion is supported by the piston pin 83 laid across the pair of pin supporting arms 82, 82 of the piston 80 so as to be capable of rotating about an axis thereof, so that the crankshaft 90 and the piston 80 are connected by the connecting rod 85.

In this crank chain, since the plugs 95 having the high specific gravity are embedded into the counter weight portion 92w of the crank web portion 92 on the opposite side of the crankpin, and even though the outer peripheral edge 92wa of the crank web portion 92 on the opposite side from the crankpin is moved largely toward the center axis, a sufficient counter weight (inertia mass) can be secured by the plugs 95. In addition, since the crank web portion 92 does not interfere with the piston 80 even when the outer peripheral edge 92wa is moved largely toward the center axis, the length of the connecting rod 85 can be reduced.

A ratio $\lambda(=L/r)$ of the length L of the connecting rod 85 (the length from the center of the crankpin to the center of the piston) with respect to a crank radius r (the distance from the rotation center of the crankshaft to the center of the crankpin) is about 2.0 or less, which is a significantly small value in comparison with the normal value $\lambda$=about 3.5.

In other words, when the same crank radius r is employed, the length L of the connecting rod 85 can be reduced significantly with respect to the normal length, and hence the piston 80 can be provided at a position closer to the crank web portion 92, so that downsizing of the internal combustion engine E is achieved.

As described above, since the ratio $\lambda$ is a small value, the piston speed near the top dead center of the piston can further be increased, whereby the cooling loss to a cylinder wall surface is reduced, thereby improving heat efficiency. The inertia mass of the crank web portion 92 can also be secured sufficiently, so that reduction of vibrations is also achieved.

The invention claimed is:

1. An internal combustion engine comprising:
a crankshaft having flywheels on both sides of a crankpin; and
a connecting rod having a large end portion and a small end portion, the large end portion is connected to the crankpin of the crankshaft and the small end portion is connected to a piston which slides in a cylinder bore via a piston pin,
wherein the flywheels are cut out at part of an outer peripheral portion thereof on a side opposite from the crankpin to reduce the length of the connecting rod,
wherein plugs with a high specific gravity are provided on the flywheels on the side of the flywheels opposite from the crankpin.

2. An internal combustion engine comprising:
a crankshaft having flywheels on both sides of a crankpin; and
a connecting rod having a large end portion and a small end portion, the large end portion is connected to the crankpin of the crankshaft and the small end portion is connected to a piston which slides in a cylinder bore via a piston pin,
wherein the flywheels are cut out at part of an outer peripheral portion thereof on a side opposite from the crankpin to reduce the length of the connecting rod,
wherein an axial line passing through a center of the cylinder bore is arranged at a position shifted toward one side with respect to a rotation center of the crankshaft, and a skirt portion of the piston is guided by an inner wall of the cylinder bore in contact with the inner wall of the cylinder bore, and the skirt portion has a width in the vertical direction on the one side that is larger than a width in the vertical direction on an opposite side.

3. An internal combustion engine comprising:
a crankshaft having disk-shaped flywheels on both sides of a crankpin, the flywheels having opposed facing side surfaces; and
a connecting rod having a large end portion and a small end portion, the large end portion is connected to the crankpin of the crankshaft end the small end portion is connected to a piston which slides in a cylinder bore via a piston pin,
wherein a distance between the opposed facing side surfaces of the flywheels is larger than the width of the piston pin and both ends of the piston pin can travel between the opposed facing side surfaces of the flywheels,
wherein a distance between the opposed facing side surfaces on the crankpin side of the flywheels is less than a distance between the opposed facing side surfaces on a side of the flywheels opposite the crankpin side.

* * * * *